(12) United States Patent
Shayani

(10) Patent No.: US 12,386,442 B1
(45) Date of Patent: Aug. 12, 2025

(54) MOUSE PAD

(71) Applicant: FINALMOUSE LLC, Irvine, CA (US)

(72) Inventor: Ashkon Shayani, Dana Point, CA (US)

(73) Assignee: Finalmouse LLC, Irvine, CA (US)

( * ) Notice: Subject to any disclaimer, the term of this patent is extended or adjusted under 35 U.S.C. 154(b) by 0 days.

(21) Appl. No.: 18/972,690

(22) Filed: Dec. 6, 2024

(51) Int. Cl.
*G06F 3/039* (2013.01)

(52) U.S. Cl.
CPC .................. *G06F 3/0395* (2013.01)

(58) Field of Classification Search
CPC .................................................. G06F 3/0395
USPC ........................................................ 345/156
See application file for complete search history.

(56) References Cited

U.S. PATENT DOCUMENTS

| | | | | |
|---|---|---|---|---|
| 5,776,585 | A * | 7/1998 | Fukuhara | G06F 3/0395 428/152 |
| 7,175,310 | B1 * | 2/2007 | Cotterell | G06F 3/0395 362/253 |
| 11,955,807 | B2 * | 4/2024 | Liang | H02J 50/005 |
| 2022/0075460 | A1 * | 3/2022 | Berkovitz | G06F 1/1632 |
| 2022/0129090 | A1 | 4/2022 | Lai | |

FOREIGN PATENT DOCUMENTS

| CN | 221239257 U | 6/2024 |
|---|---|---|
| WO | WO 2024112221 A1 | 5/2024 |

* cited by examiner

*Primary Examiner* — Calvin C Ma
(74) *Attorney, Agent, or Firm* — Fish & Richardson P.C.

(57) ABSTRACT

A mouse pad can be used together with a computer mouse to improve the controllability of the computer mouse. The mouse pad includes fabric and a rigid layer.

39 Claims, 19 Drawing Sheets

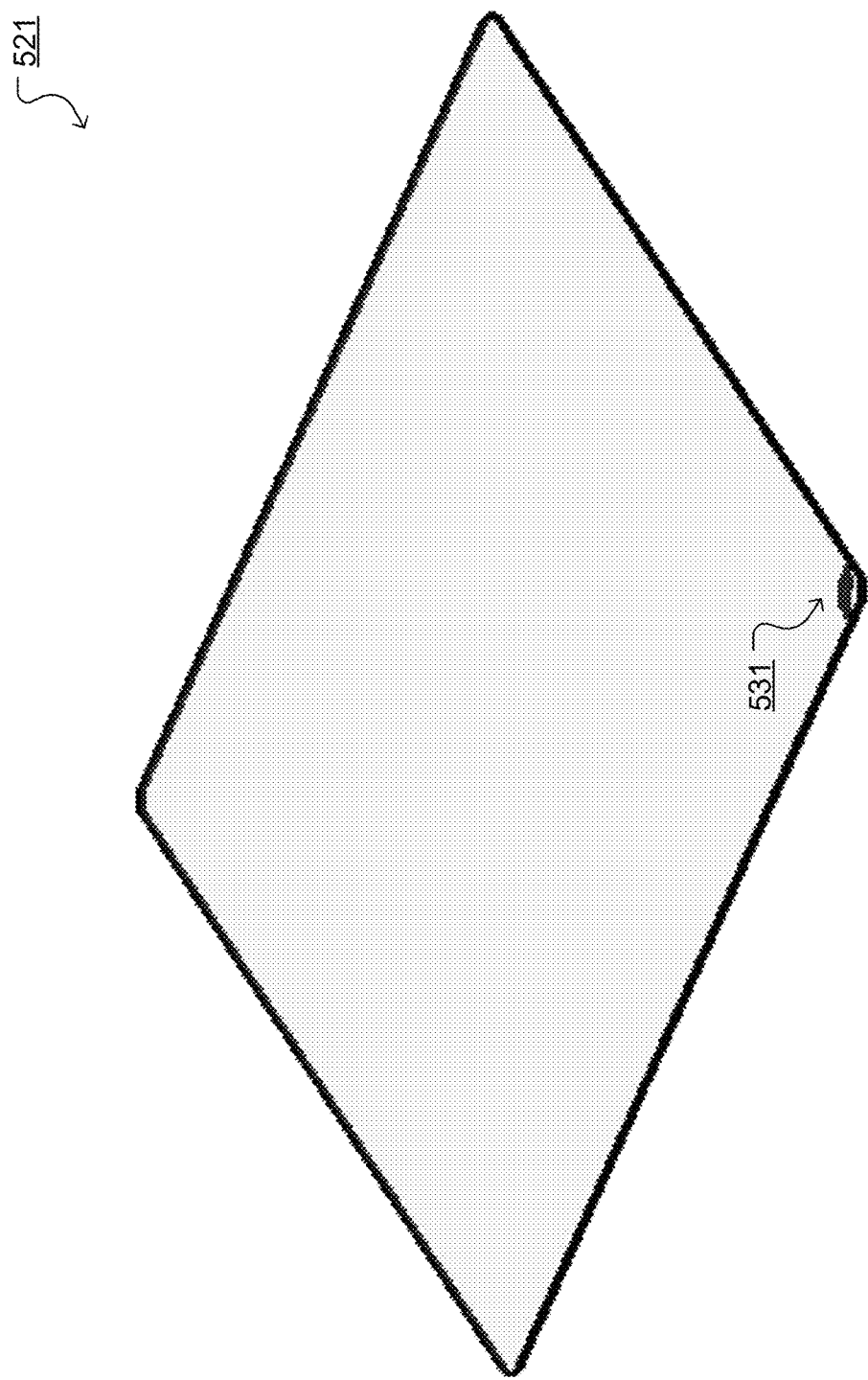

521

622B

MOUSE PAD

TECHNICAL FIELD

This specification relates to a mouse pad that includes a rigid layer.

BACKGROUND

A computer mouse can be operated by a user to control operations of a computing device, e.g., a desktop computer or a laptop computer. For example, the computer mouse can be a wireless computer mouse that emits wireless signals to control the operations of the computing device. A mouse pad can be used together with the computer mouse to improve the controllability of the computer mouse.

SUMMARY

As described in this disclosure, implementations of a mouse pad include fabric and a rigid layer including a rigid material such as, for example, glass.

Advantages of implementations of the mouse pad described in this disclosure may include those described below and elsewhere in this disclosure. The mouse pad is typically used with a computer mouse that is used to control operations of a computing device and that, in particular, can be used to control the location of a cursor represented on a user interface associated with a computing device and be used to interact with affordances displayed on the user interface.

The mouse pad, by including both the fabric and the rigid layer, has advantages that derive from both of these components. For example, the mouse pad benefits from both the rigidity of the rigid layer and the user comfort provided by the fabric. The rigid layer included as part of the mouse pad provides rigidity to the mouse pad such that the computer mouse can be more easily moved across a surface of the mouse pad. Such rigidity to allows for mouse tracking with improved accuracy and minimal inconsistencies. This can, for example, ensure that movement of the cursor on the user interface more closely corresponds to a user's intent, providing the user with more precise control of the operations of a computing device. The rigidity of the rigid layer also enables rapid mouse movements with minimal user effort, which is beneficial to achieve fast reflexes in certain applications, e.g., electronic gaming (E-sports) applications.

By partially defining the upper surface of the mouse pad, the fabric can provide a comfortable surface for the user to rest their hand or wrist and can provide a less abrasive surface across which the user moves their hand or wrist. The material of the fabric can be selected to generate minimal friction between the computer mouse and the mouse pad so that the user can easily move the computer mouse across the mouse pad and so that the mouse pad does not abrade the user's hand. As compared to a mouse pad with an upper surface defined entirely by the rigid layer, the fabric can feel more comfortable to a user's hand. The fabric can occupy a majority of the upper surface of the mouse pad and can occupy a central area of the upper surface so that the computer mouse and the user's hand are generally contacting the fabric during operation of the mouse pad.

Both the fabric and the rigid layer can be visible on the upper surface of the mouse pad, and these two components can have visible differences such that a user can immediately recognize that the mouse pad has technical benefits associated with both the use of fabric and the use of a rigid material, as discussed above. Moreover, because multiple materials are visible on the upper surface of the mouse pad, a designer of the mouse pad can select a pattern of how the materials are arranged on the upper surface that is more aesthetically pleasing. Furthermore, with the fabric and the rigid layer being selectively arranged on the upper surface of the mouse pad, a designer can communicate information on the mouse pad in a more aesthetically pleasing and noticeable way by, for example, including information (e.g., instructions for use, a logo, or other communicative information) on only a visible portion of one of the materials, e.g., only a visible portion of the fabric or only a visible portion of the rigid layer. The fabric and the rigid layer additionally can be arranged on the upper surface in a seamless way that can reduce the likelihood of any noticeable tactile changes as the computer mouse is moved from a part of the upper surface of the mouse pad defined by the fabric to another part of the upper surface of the mouse pad defined by the rigid layer.

Advantageously, the described mouse pad maintains the same characteristics throughout its entire surface. Unlike traditional, cloth mouse pads that can wear down or become uneven during use, the described mouse pad generally maintains its surface quality for longer periods, ensuring consistent performance over time.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 5B is a perspective view of the base plate of FIG. 5A.

DETAILED DESCRIPTION

The present disclosure describes implementations of a mouse pad that can be used together with a computer mouse or another device for providing user inputs to a computing device. A mouse pad is usually used to assist a user during operation of the computer mouse. By moving the computer mouse over the mouse pad, the user can move a cursor on a display of the computing device and sense a cursor displacement on the display. A suitable mouse pad is therefore critical for precise control of the operations of the computing device.

Generally, the smoother the surface of the mouse pad, the smoother the movement of the computer mouse, and in turn, the more accurate the control of the cursor on the display. A smooth, hard, and rigid mouse pad can facilitate movement of the computer mouse over the mouse pad, allowing the user to more smoothly move the computer mouse across the mouse pad, to thereby more accurately control the movement of the cursor on the display. The smooth, hard, and rigid mouse pad can be particularly advantageous for use together with a computer mouse during electronic gaming, where timely and precise user responses over prolonged periods of play can improve performance in an electronic game.

Figure 1:
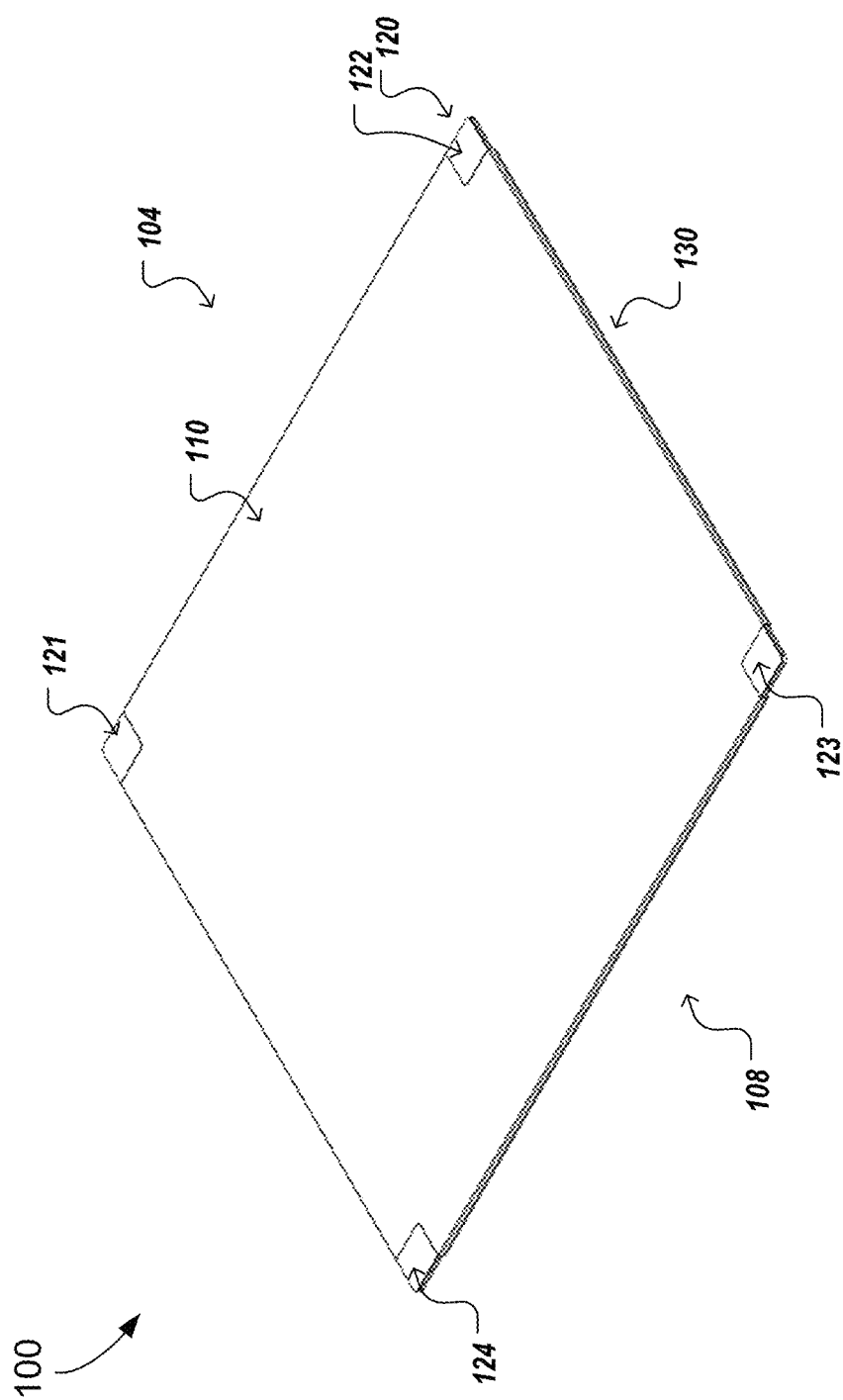
FIG. 1 is a perspective view of an example of a mouse pad.

FIG. 1 is an illustration of an example of a mouse pad 100. The mouse pad 100 includes fabric 110 and a rigid layer 120 that collectively define an upper surface 104 of the mouse pad 100. In use, a computer mouse can be placed in contact with and can move across the upper surface 104. In particular, the computer mouse can come in contact with both the fabric 110 and the rigid layer 120. In the example of FIG. 1, the mouse pad 100 has a rectangular shape, although this may vary in implementations. For example, in some implementations, the mouse pad 100 can have a circular shape, an oval shape, a polygonal shape (e.g., square), or any other shape with a substantially flat upper surface.

The fabric 110 partially covers an upper surface of the rigid layer 120. That is, the fabric 110 only covers a portion of the upper surface of the rigid layer 120. Since only a portion of the rigid layer 120 is covered by the fabric 110, the rigid layer 120 included in the mouse pad 100 is at least partially exposed. That is, the rigid layer 120 includes one or more exposed surfaces, e.g., exposed surfaces 121-124, that are not covered by the fabric 110.

In the example of FIG. 1, the rigid layer 120 has four corners, and the four corners of the rigid layer 120 define the exposed surfaces, e.g., exposed surfaces 121-124, of the rigid layer 120 that are not covered by the fabric 110 and that partially define the upper surface 104 of the mouse pad 100. When viewed from above, i.e., viewed along an upper portion of the mouse pad 100, both the fabric 110 and the rigid layer 120 included in the mouse pad 100 are at least partially visible.

The mouse pad 100 also includes a lower portion 130 that is arranged below the fabric 110 and below the rigid layer 120. The lower portion 130 has an upper surface that is in contact with the fabric 110, the rigid layer 120, or both. The lower portion 130 also has a lower surface that defines a grip surface 108 of the mouse pad 100. The grip surface 108 provides anti-slip properties for the mouse pad 100—when being placed on top of and in contact with a desktop or another flat surface, the lower portion 130 increases a frictional resistance to desktop to substantially prohibit slippage in the horizontal direction, such that the mouse pad 100 can be held stationary on the desktop.

Figure 2:
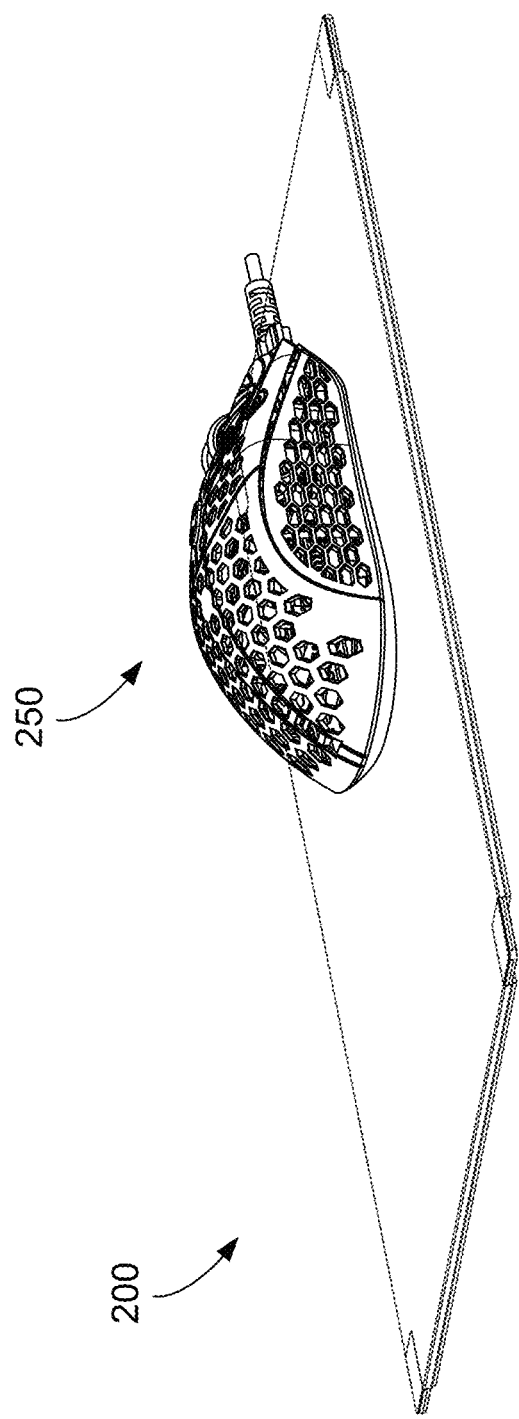
FIG. 2 is an illustration of an example of a mouse pad in use with an example of a computer mouse.

FIG. 2 is an illustration of an example of a mouse pad 200 and an example of a computer mouse 250. For example, the mouse pad 200 can be the same as the mouse pad 100 of FIG. 1, while the computer mouse 250 can be one of the example computer mouses described in U.S. Pat. No. 11,625,109, entitled "computer mouse," although in implementations the computer mouse 250 can be any computer mouse, e.g., any wired or wireless computer mouse. In use, the computer mouse can be used to permit user control of a cursor on a display of a computing device.

The mouse pad 200 allows a user to more smoothly move the computer mouse 250, to thereby more accurately control the operations of the computing device by more precisely moving a cursor on the display of the computing device. Examples of the computing device include a personal computer, a desktop computer, a laptop computer, a tablet computer, to name just a few. For example, when used together with the mouse pad 200, the computer mouse 250 can produce control signals used to perform any of a variety of operations including, e.g., cursor movement, single click, double click, left click, and right click operations, on the computing device.

Figure 3:
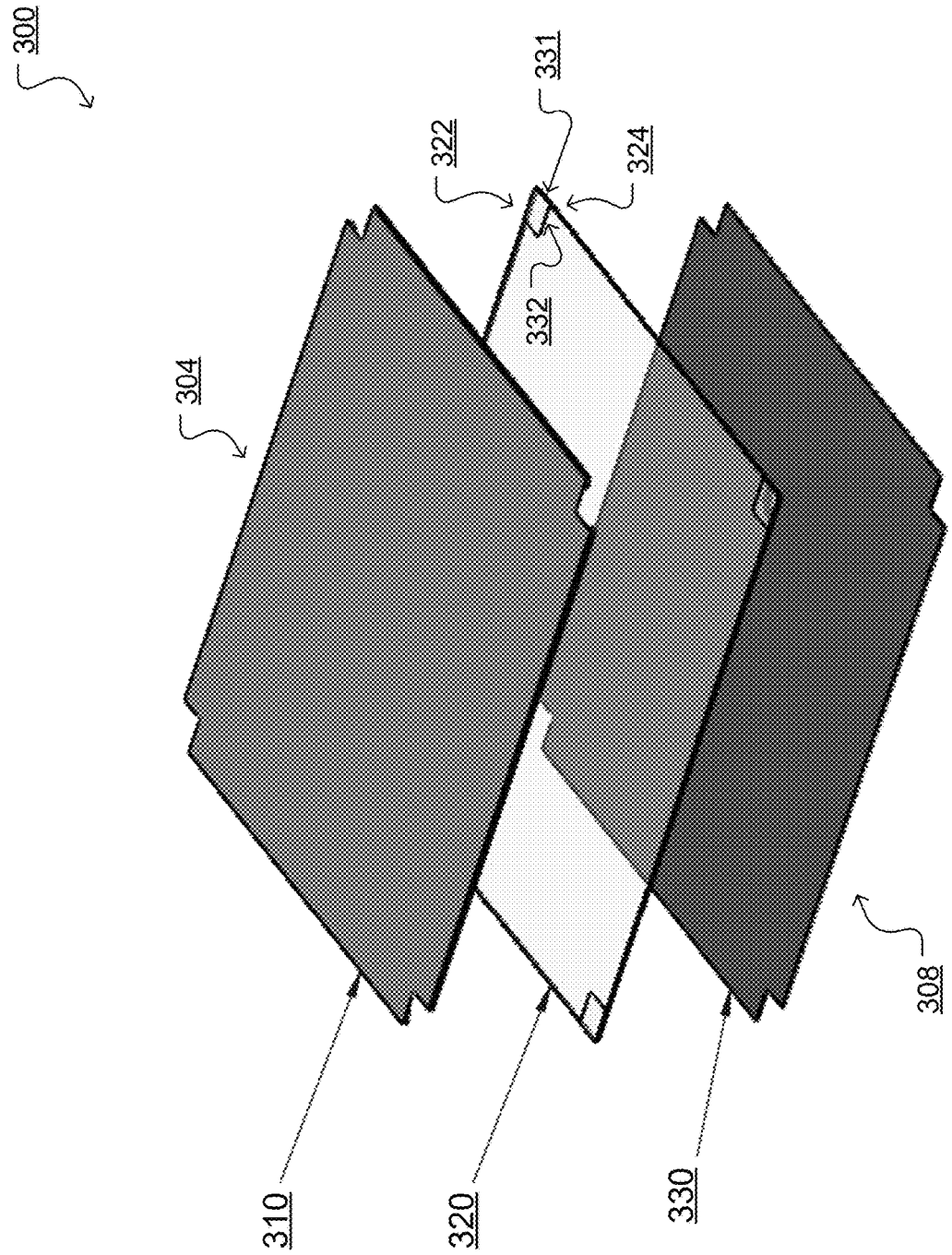
FIG. 3 is an exploded, perspective view of an example of a mouse pad.

FIG. 3 is an exploded, perspective view of an example of a mouse pad 300. For example, the mouse pad 300 can be the same as the mouse pad 100 of FIG. 1. The mouse pad 300 includes fabric 310, a rigid layer 320, and a lower portion 330.

The fabric 310 is opaque. The fabric 310 can be made of any fabric which may be produced by weaving, plain weaving, or knitting. Examples of fabric include polyester, cotton, wool, silk, rayon, linen, nylon, and blends thereof.

The rigid layer 320 is translucent and, in some implementations, transparent. The shape of the rigid layer 320 generally defines the shape of the mouse pad 300. For example, in FIG. 3, because the rigid layer 320 has a rectangular shape, the mouse pad 300 also has a rectangular shape.

The fabric 310 includes an upper portion and a lower portion, as described in detail with respect to FIGS. 7A-E. The rigid layer 320 includes an upper surface, a lower surface, and one or more lateral surfaces around a perimeter of the rigid layer 320, as described in detail with respect to FIGS. 4A-C.

In some implementations, the rigid layer 320 is partially covered (e.g., wrapped) by the fabric 310. In addition, the rigid layer 320 includes one or more exposed surfaces that are not covered by the fabric 310. The one or more exposed surfaces of the rigid layer 320 that are not covered by the fabric 310 include one or more first exposed surfaces, e.g., first exposed surface 322, that are on the upper surface of the rigid layer 320 and that are visible along an upper portion of the mouse pad 300. When viewed from above, both the upper portion of the fabric 310 and the one or more first exposed surfaces of the rigid layer 320 are visible, e.g., as shown in the example of FIG. 1.

The mouse pad 300 includes an upper surface 304 which is collectively defined by the fabric 310 and the rigid layer 320—with the upper portion of the fabric 310 partially defining the upper surface 304 of the mouse pad 300, and one or more first exposed surfaces of the rigid layer 320 partially defining the upper surface 304 of the mouse pad 300.

In the example of FIG. 3, the rigid layer has a total of four first exposed surfaces. Each of the four first exposed surfaces is positioned at a corresponding corner portion of the 4 corner portions of the mouse pad 300. However, this may vary in implementations of the mouse pad 300. For example, in some implementations, the rigid layer has only a single first exposed surface. This first exposed surface, in some implementations, is positioned at one of the 4 corner portions of the mouse pad 300. Alternatively, this first exposed surface is positioned in an interior portion of the upper surface of the mouse pad 300 or a central area of the upper surface of the mouse pad 300. As another example, in some implementations, the rigid layer has two first exposed surfaces that are positioned at two of the four corner portions of the mouse pad 300.

As illustrated in FIG. 3, in some implementations, the first exposed surface 322 can have a rectangular shape with four edges when viewed in the vertical direction. In these implementations, the first exposed surface 322 has a first edge 331 that at least partially defines an outer perimeter of the upper surface of the mouse pad. The first exposed surface also has a second edge 332 that extends along a perimeter of the upper portion of the fabric 310. The first edge 331 and the second edge 332 are perpendicular to one another. In this manner, the first edge 331 and the second edge 332 at least partially defines the rectangular shape of the first exposed surface 322. In some implementations, the first exposed surface 322 has a curved edge (e.g., a fillet) connecting the first edge 331 and the second edge 332.

Moreover, the one or more exposed surfaces of the rigid layer 320 that are not covered by the fabric 310 include one or more second exposed surfaces, e.g., second exposed surface 324, that are on the lower surface of the rigid layer 320 and that are visible along a lower portion of the mouse pad 300. When viewed from bottom, at least the one or more second exposed surfaces of the rigid layer 320 are visible (the lower portion of the fabric 310 may not be visible because it is obstructed by the lower portion 330).

Much like the first exposed surfaces, in various implementations, the rigid layer can have a total of four or fewer second exposed surfaces, e.g., three second exposed surfaces or two second exposed surfaces. In some implementations, the second exposed surface 332 can have a rectangular shape with four edges when viewed in the vertical direction. These four edges can, in some implementations, be interconnected by one or more curved edges (e.g., fillets).

In some implementations, the one or more first exposed surfaces and the one or more second exposed surfaces are aligned in the vertical direction, i.e., aligned along a height of the rigid layer 320. For example, the exposed surface 322 and the exposed surface 324 can occupy the same region of the rigid layer 320 on opposite surfaces, i.e., the upper and lower surfaces, respectively, of the rigid layer 320. In some implementations, the one or more first exposed surfaces can have an identical shape, size, or both. In some implementations, the one or more second exposed surfaces can have an identical shape, size, or both. In some implementations, each of the one or more first exposed surfaces can have an identical shape, size, or both as each of the one or more second exposed surfaces.

In some implementations, the first exposed surface 322 has a length between 10 and 60 millimeters (e.g., between 10 and 50 millimeters, between 20 and 60 millimeters, between 20 and 50 millimeters, between 20 and 40 millimeters, about 25 millimeters, about 30 millimeters, about 35 millimeters, etc.) along a longitudinal dimension (length) of the mouse pad 300.

In some implementations, the first exposed surface 322 has a length between 10 and 40 millimeters (e.g., between 10 and 30 millimeters, between 20 and 40 millimeters, between 20 and 30 millimeters, about 20 millimeters, about 25 millimeters, about 30 millimeters, etc.) along a latitudinal dimension (width) of the mouse pad 300.

In implementations where the one or more first exposed surfaces and the one or more second exposed surfaces are aligned in the vertical direction, the second exposed surface 324 similarly has a length between 10 and 60 millimeters along the longitudinal dimension (length) of the mouse pad 300, and a length between 10 and 40 millimeters along the latitudinal dimension (width) of the mouse pad 300.

The upper portion of the fabric 310 extends along a portion of the upper surface of the rigid layer 320. The upper portion of the fabric 310 does not extend along the entirety of the upper surface of the rigid layer 320, e.g., it does not extend into the one or more first exposed surfaces of the rigid layer 320. The lower portion of the fabric 310 extends along a portion of the lower surface of the rigid layer 320. The lower portion of the fabric 310 does not extend along the entirety of the lower surface of the rigid layer 320, e.g., it does not extend into the one or more second exposed surfaces of the rigid layer 320. In this manner, the fabric 310 partially covers (e.g., wraps around) the rigid layer 320.

The fabric 310 and the rigid layer 320 are secured to one another. An adhesive can be applied to at least part of the fabric 310, the rigid layer 320, or both to aid in securing the fabric 310 and the rigid layer 320 together. For example, the adhesive can be a solid adhesive, e.g., a pressure sensitive adhesive (PSA) (e.g., an optical clear adhesive (OCA)), an epoxy adhesive, or an acrylic adhesive, or a liquid adhesive, e.g., an epoxy or urethane resin.

The lower portion 330 is opaque. The lower portion 330 can be made of a rubber material, a silicone material, a resin material, or another elastic material. For example, the lower portion 330 can include a single rubber layer that is formed by molding or multiple rubber layers that are formed by laminating.

The lower portion 330 is arranged below the fabric 310 and below the rigid layer 320. The lower portion 330 has an upper surface that faces toward the fabric 310 and the rigid layer 320. Similarly, an adhesive can be applied to at least part of the upper surface of the lower portion 330 to aid in adhering the lower portion 330 to the fabric 310, the rigid layer 320, or both. The lower portion 330 has a lower surface that faces away from the fabric 310 and the rigid layer 320 and that defines a grip surface 308 of the mouse pad 100. When the mouse pad 300 is placed on top of a working surface (e.g., a surface of a desk or a table) the grip surface 308 comes in contact with the working surface and reduces relative movement between the mouse pad 300 and the working surface.

Generally, the fabric 310 and the rigid layer 320 are situated on the lower portion 330, such that at least a portion of the fabric 310 and the rigid layer 320 overlaps at least a portion of the lower portion 330. The portion of the fabric 310 and the rigid layer 320 that overlaps the portion of the lower portion 330 may include the part of the upper surface of the lower portion 330 to which adhesive was applied.

Figure 4A:
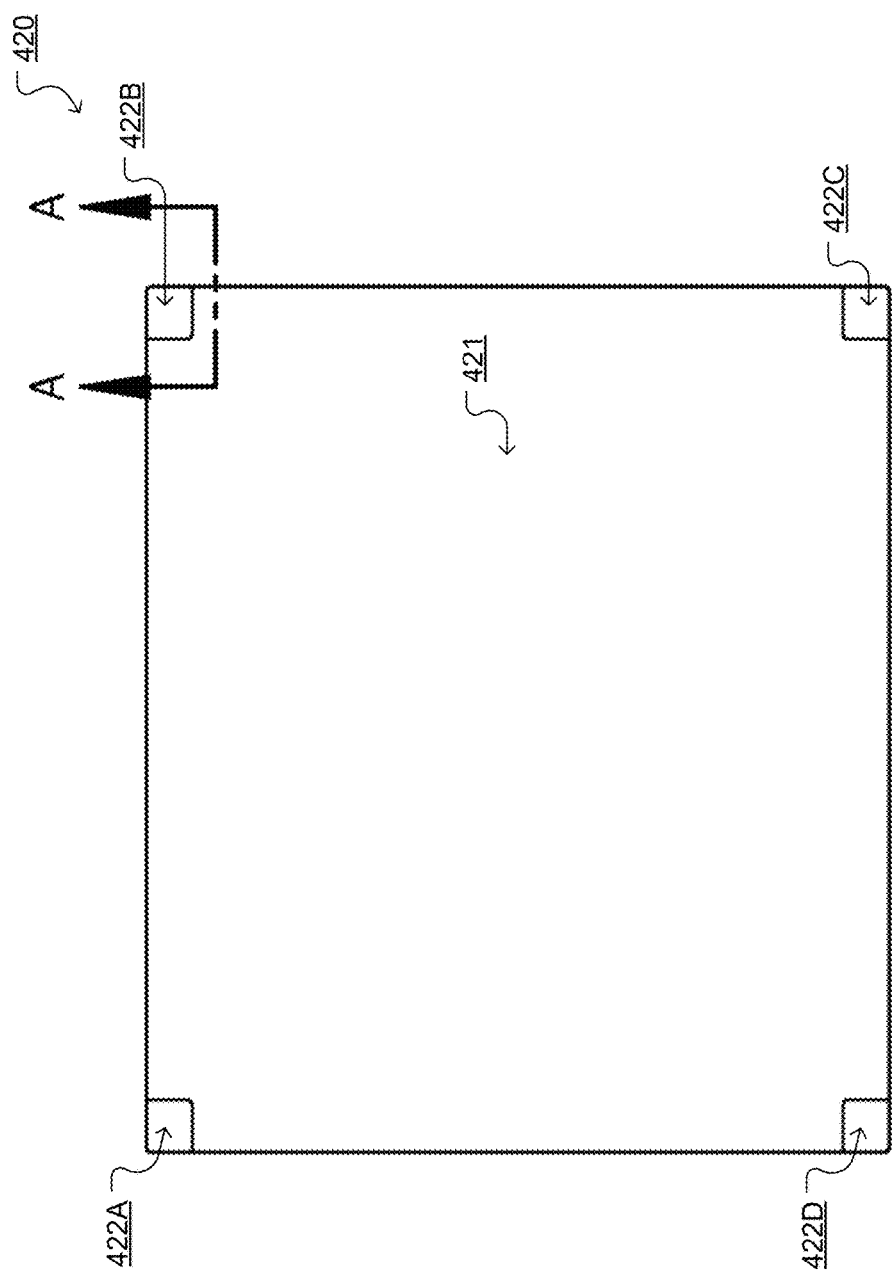
FIG. 4A is a top view of an example of a rigid layer.

FIG. 4A is a top view of an example of a rigid layer 420. For example, the rigid layer 420 can be the same as the rigid layer 120 of FIG. 1. In FIG. 4A, the rigid layer 420 has a rectangular shape with four rounded corners when viewed in the vertical direction.

In implementations, the rigid layer 420 includes a base plate 421 and one or more protrusions. In the example shown in FIG. 4A, the rigid layer 420 includes four protrusions 422A, 422B, 422C, and 422D on the base plate 421.

The base plate 421 is translucent and, in some implementations, transparent. The base plate 421 can include glass. Hence it may also be referred to as a glass plate. In some implementations, the base plate 421 is made of or includes a glass material. For example, the base plate 421 can be made of a sapphire glass, crystal glass, tempered glass, or other glass material that is translucent, e.g., transparent. In some implementations, the base plate 421 is made of a composite material that is translucent, e.g., transparent. For example, the base plate 421 can be made of a fiberglass material that includes glass fibers and a resin binder that holds the individual glass fibers together. In other implementations, the base plate includes another rigid material besides glass, such as metal, wood, a hard plastic, or other rigid material.

The one or more protrusions are translucent and, in some implementations, transparent. In some implementations, the one or more protrusions are made of different translucent, e.g., transparent material than the base plate. For example, the one or more protrusions can be made of a polymer material (e.g., polycarbonate, plastic (e.g., acrylic), polyethylene terephthalate, or other appropriate polymer material that can be translucent or transparent. In some implementations, the one or more protrusions are made of the same glass material that is included in the base plate.

The base plate 421 has a rectangular shape when viewed in the vertical direction. The one or more protrusions are located around a perimeter of the base plate 421, e.g., at the corner portions of the base plate 421. Each protrusion 422A-D also has a rectangular shape when viewed in the vertical direction. In some implementations, the one or more protrusions can have an identical shape, size, or both.

The rigid layer 420 can have a width between 100 and 600 millimeters (e.g., between 100 and 500 millimeters, between 200 and 500 millimeters, between 300 and 600 millimeters, between 300 and 500 millimeters, between 350 and 500 millimeters, at least 300 millimeters, at least 350 millimeters, at least 400 millimeters, about 370 millimeters, about 420 millimeters, etc.), a length between 100 and 800 millimeters (e.g., between 100 and 700 millimeters, between 200 and 700 millimeters, between 200 and 600 millimeters, between 300 and 600 millimeters, between 400 and 600 millimeters, between 400 and 500 millimeters, at least 400 millimeters, at least 450 millimeters, about 430 millimeters, about 490 millimeters, etc.).

The width of the rigid layer 420 refers to a dimension of the rigid layer 420 along a latitudinal dimension of the mouse pad. The length of the rigid layer 420 refers to a dimension of the rigid layer 420 along a longitudinal dimension of the mouse pad.

Each rounded corner of the rigid layer 420 can have a radius of curvature between 1.0 and 6.0 millimeters (e.g., between 1.0 and 5.0 millimeters, between 1.0 and 4.0 millimeters, between 2.0 and 3.0 millimeters, about 3.0 millimeters, about 2.75 millimeters, etc.).

Figure 4B:
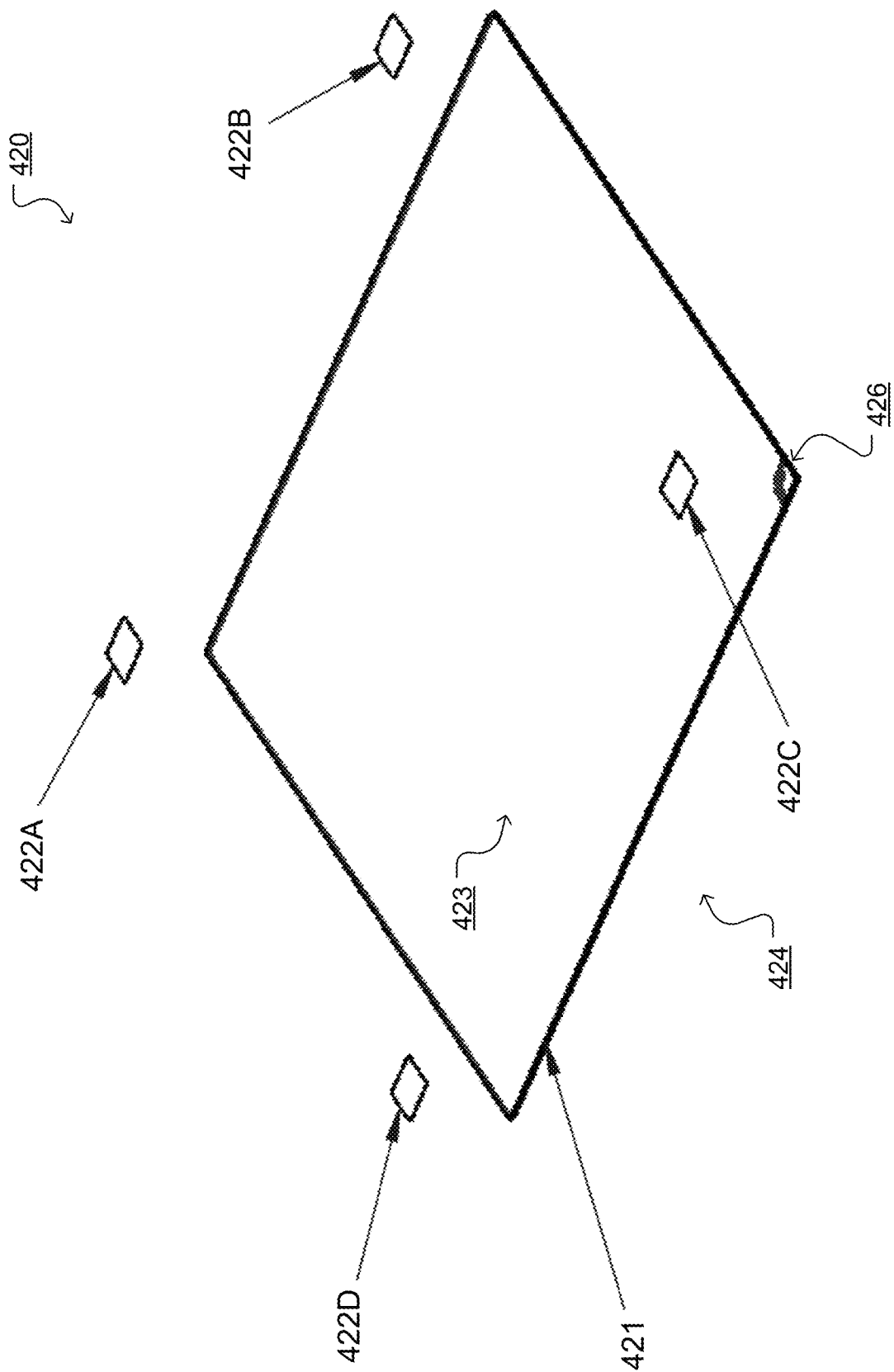
FIG. 4B is an exploded, perspective view of the rigid layer of FIG. 4A.

FIG. 4B is an exploded, perspective view of the rigid layer 420 of FIG. 4A. The rigid layer 420 includes a base plate 421. The base plate 421 includes an upper surface 423 and a lower surface 424. The upper surface 423 and the lower surface 424 of the base plate 421 are substantially planar and parallel to each other. The one or more protrusions, e.g., protrusions 422A, 422B, 422C, and 422D, of the rigid layer 420 extend upwardly from the upper surface 423 of the base plate 421, i.e., extend away from the lower surface 424 of the base plate 421.

In some implementations, the one or more protrusions are affixed to the upper surface 423 of the base plate 421. For example, the base plate and each of the one or more protrusions can be manufactured as individual parts, and then the one or more protrusions are affixed to the upper surface of the base plate with use of adhesive, which can be any one of the adhesives mentioned above. In other implementations, the one or more protrusions are integral to the base plate 421. For example, the base plate and the one or more protrusions can be manufactured altogether in one manufacturing process like casting.

Figure 4C:
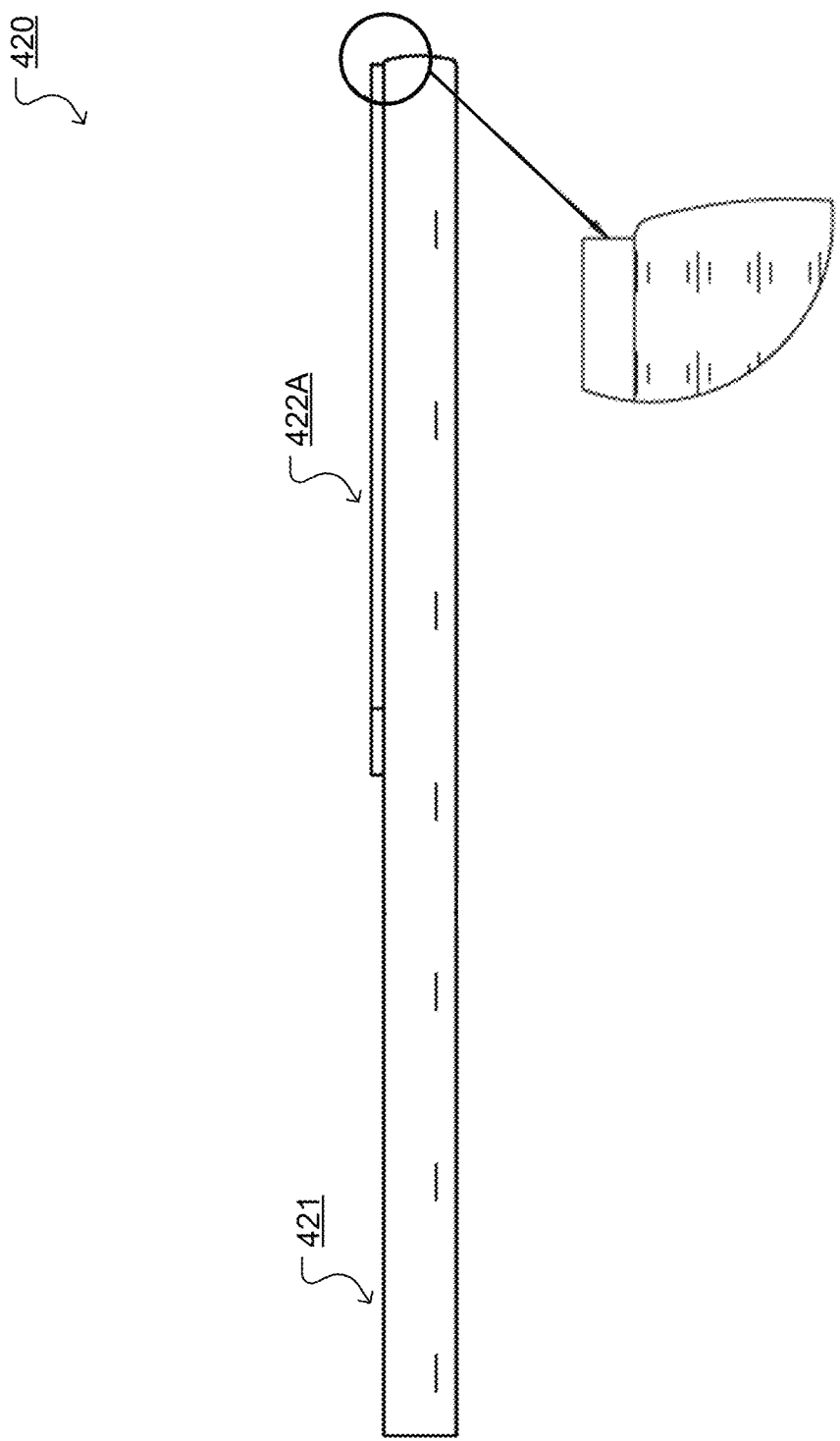
FIG. 4C is a side view of a part of the rigid layer of FIG. 4A.

FIG. 4C is a side view of a part of the rigid layer 420 of FIG. 4A. In the example of FIG. 4C, the base plate 421 has a curved edge along its perimeter when viewed in the horizontal direction. In other examples, however, the base plate 421 can have an edge with a different shape, e.g., a vertical edge, along its perimeter when viewed in the horizontal direction.

The base plate 421 of the rigid layer 420 can have a thickness (or height) between 1 millimeter and 10 millimeters (e.g., between 1 and 8 millimeters, between 1 and 7 millimeters, between 1 and 5 millimeters, between 1 and 3 millimeters, about 2 millimeters, about 3 millimeters, about 5 millimeters, about 7 millimeters, about 10 millimeters, etc.).

The protrusion 422A of the rigid layer 420 can have a rectangular shape when viewed in the horizontal direction. The vertical edge of the protrusion 422A aligns with the edge of the base plate 421. For example, FIG. 4C, the vertical edge of the protrusion 422A aligns with the tangent of the corner break on the base plate 421.

The protrusion 422A can have a thickness (or height) between 0.1 millimeters and 2 millimeters (e.g., between 0.1 millimeters and 1.5 millimeters, between 0.1 millimeters and 1 millimeter, between 0.2 and 1 millimeter, between 0.2 and 0.6 millimeter, about 0.2 millimeters, about 0.3 millimeters, about 0.5 millimeters, about 0.7 millimeters, about 1 millimeter, etc.).

Therefore, the rigid layer 420 can have an overall thickness (or height) between 1.1 millimeters and 12 millimeters, e.g., about 3.5 millimeters, about 5 millimeters, about 6.5 millimeters, etc. Generally, however, the protrusion 422A is thinner than the base plate 421. For example, the thickness of protrusion 422A relative to the base plate 421 is less than 80%, 60%, 40%, 20%, or less, of the thickness of the base plate 421 of the rigid layer 420.

Figure 5A:
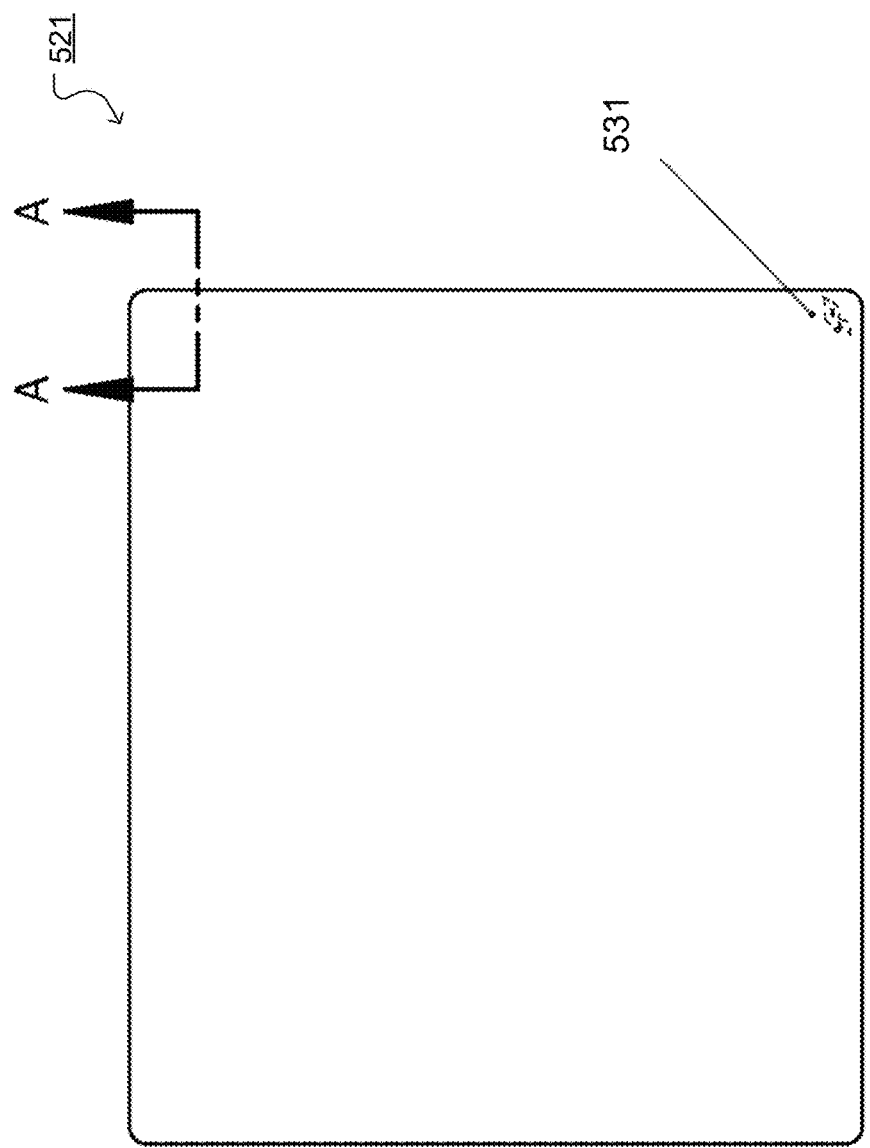
FIG. 5A is a top view of an example of a base plate of a rigid layer.
Figure 5C:
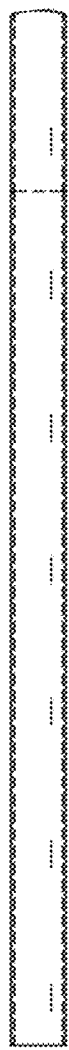
FIG. 5C is a side view of a part of the base plate of FIG. 5A.

FIG. 5A is a top view of an example of a base plate 521. FIG. 5B is a perspective view of the base plate 521 of FIG. 5A. FIG. 5C is a side view of a part of the base plate 521 of FIG. 5A. For example, the base plate 521 can be the same as the base plate 421 of FIG. 4A. In FIG. 5A, the base plate 521 has a rectangular shape with four rounded corners when viewed in the vertical direction. The base plate 521 can have a width between 100 and 600 millimeters (e.g., between 100 and 500 millimeters, between 200 and 500 millimeters, between 300 and 600 millimeters, between 300 and 500 millimeters, between 350 and 500 millimeters, at least 300 millimeters, at least 350 millimeters, at least 400 millimeters, about 370 millimeters, about 420 millimeters, etc.), a length between 100 and 800 millimeters (e.g., between 100 and 700 millimeters, between 200 and 700 millimeters, between 200 and 600 millimeters, between 300 and 600 millimeters, between 400 and 600 millimeters, between 400 and 500 millimeters, at least 400 millimeters, at least 450 millimeters, about 430 millimeters, about 490 millimeters, etc.).

In some implementations, as illustrated in FIG. 5A, the base plate 521 can have graphics and/or text 531 etched, printed, or otherwise decorated on the upper surface of the base plate 521. Analogously, the base plate 521 can have graphics and/or text 531 etched, printed, or otherwise decorated on the lower surface of the base plate 521. For example, the graphics and/or text 531 can represent an iconography. As used herein, an "iconography" refers to visual images, symbols, illustrations, pictorial material, artwork or modes of representation collectively associated with a particular person, group, entity or subject matter. Examples of iconography include logos, trademarks, service mark, to name just a few.

Figure 6A:
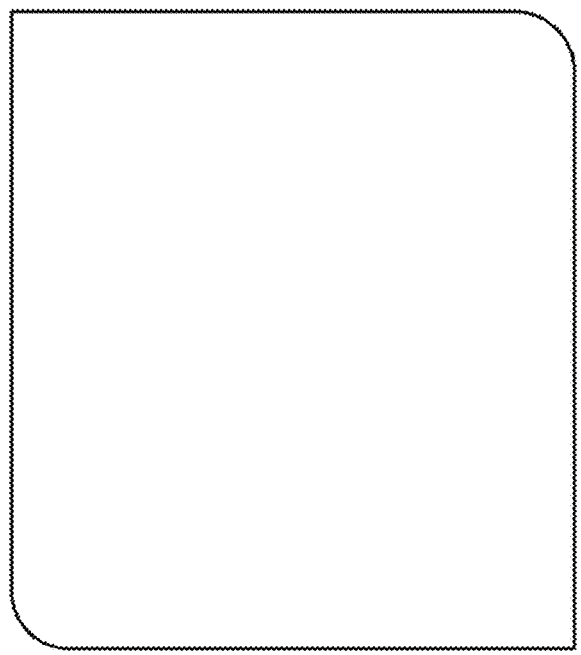
FIG. 6A is a top view of an example of a protrusion of a rigid layer.

FIG. 6A is a top view of an example of a protrusion 622A. For example, the protrusion 622A can be the same as one of the protrusions, e.g., the protrusion 422A or the protrusion 422C, of FIG. 4A. The protrusion 622A has a rectangular shape with four corners when viewed in the vertical direction. In some implementations, all of the four corners are rounded. In some implementations, some of the four corners are rounded. For example, in FIG. 6A, the top left corner and its diametrically opposite corner (the bottom right corner) are rounded. In some implementations, none of the four corners is rounded.

Each rounded corner of the protrusion 622A can have a radius of curvature between 1.0 and 6.0 millimeters (e.g., between 1.0 and 5.0 millimeters, between 1.0 and 4.0 millimeters, between 2.0 and 3.0 millimeters, about 3.0 millimeters, about 2.62 millimeters, about 2.75 millimeters, etc.). In some implementations, all rounded corners of the protrusion 622A have the same radius of curvature while in other implementations, a rounded corner of the protrusion 622A has a different radius of curvature than another rounded corner of the protrusion 622A.

The protrusion 622A can have a width between 10 and 40 millimeters (e.g., between 10 and 30 millimeters, between 20 and 40 millimeters, between 20 and 30 millimeters, about 20 millimeters, about 25 millimeters, about 30 millimeters, etc.), a length between 10 and 60 millimeters (e.g., between 10 and 50 millimeters, between 20 and 60 millimeters, between 20 and 50 millimeters, between 20 and 40 millimeters, about 25 millimeters, about 30 millimeters, about 35 millimeters, etc.).

The width of the protrusion 622A refers to a dimension of the protrusion 622A along a latitudinal dimension of the mouse pad. The length of the protrusion 622A refers to a dimension of the protrusion 622A along a longitudinal dimension of the mouse pad. In some implementations, the length of the protrusion 622A is greater than the width of the protrusion 622A.

Figure 6B:
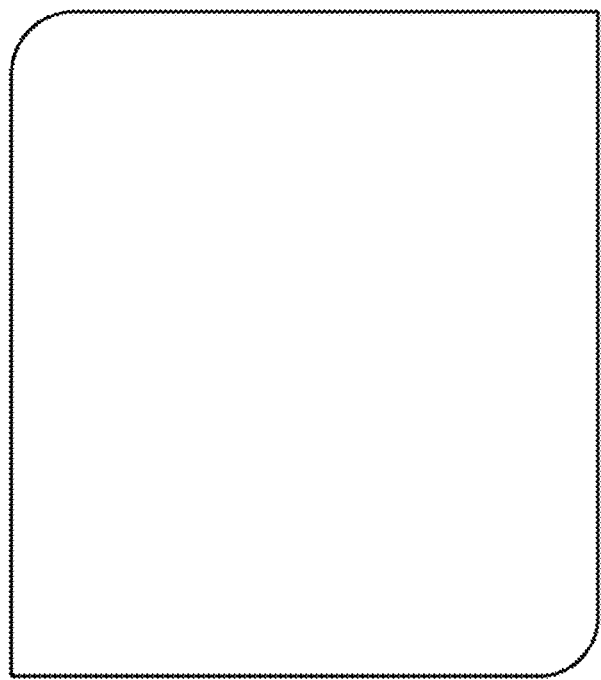
FIG. 6B is a top view of another example of a protrusion of a rigid layer.

FIG. 6B is a top view of an example of a protrusion 622B. For example, the protrusion 622B can be the same as one of the protrusions, e.g., the protrusion 422B or the protrusion 422D, of FIG. 4A. The protrusion 622B has a rectangular shape with four corners when viewed in the vertical direction. In some implementations, all of the four corners are rounded. In some implementations, some of the four corners are rounded. For example, in FIG. 6B, the top right corner and its diametrically opposite corner (the bottom left corner) are rounded. In some implementations, none of the four corners is rounded.

Each rounded corner of the protrusion 622B can have a radius of curvature between 1.0 and 6.0 millimeters (e.g., between 1.0 and 5.0 millimeters, between 1.0 and 4.0 millimeters, between 2.0 and 3.0 millimeters, about 3.0 millimeters, about 2.62 millimeters, about 2.75 millimeters, etc.). In some implementations, all rounded corners of the protrusion 622B have the same radius of curvature while in other implementations, a rounded corner of the protrusion 622B has a different radius of curvature than another rounded corner of the protrusion 622B.

The protrusion 622B can have a width between 10 and 40 millimeters (e.g., between 10 and 30 millimeters, between 20 and 40 millimeters, between 20 and 30 millimeters, about 20 millimeters, about 25 millimeters, about 30 millimeters, etc.), a length between 10 and 60 millimeters (e.g., between 10 and 50 millimeters, between 20 and 60 millimeters, between 20 and 50 millimeters, between 20 and 40 millimeters, about 25 millimeters, about 30 millimeters, about 35 millimeters, etc.).

Figure 6C:
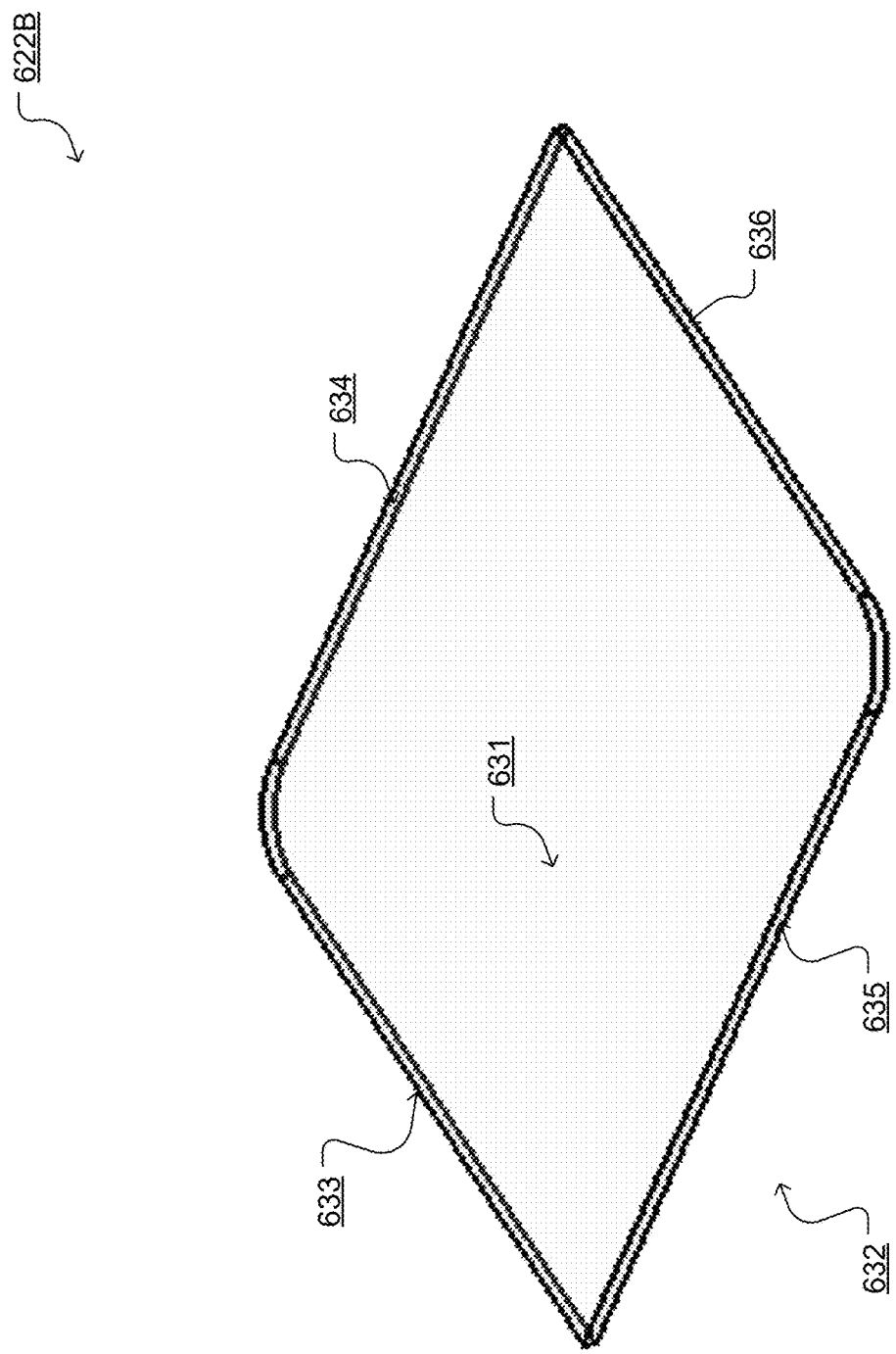
FIG. 6C is a perspective view of the protrusion of FIG. 6B.
Figure 6D:
FIG. 6D is a side view of the protrusion of FIG. 6B.

FIG. 6C is a perspective view of the protrusion 622B of FIG. 6B. FIG. 6D is a side view of the protrusion 622B of FIG. 6B. The protrusion 622B includes an upper surface 631, a lower surface 632, and four lateral surfaces 632, 633, 634, and 635 around a perimeter of the protrusion 622B. The length of the lateral surface 633 can define the width of the protrusion 622B, while the length of the lateral surface 634 can define the length of the protrusion 622B.

The upper surface 631 and the lower surface 632 of the protrusion 622B are substantially planar and parallel to each other. The upper surface 631 of the protrusion 622B faces away from the base plate of the rigid layer. The lower surface 632 of the protrusion 622B faces toward the base plate of the rigid layer. For example, when manufactured as individual parts, adhesive can be applied on the lower surface 632 of the protrusion 622B to affix the protrusion 622B to the upper surface of the base plate.

The upper surface 631 of the protrusion 622B generally defines a first exposed surface of the rigid layer that is visible along an upper portion of the mouse pad. In some implementations, the upper surface 631 of the protrusion 622B can define the entirety of one of the first exposed surfaces of the rigid layer. For example, the upper surface 631 can define the entirety of the first exposed surface 322 of FIG. 3. In this example, the lateral surface 634 can define the first edge 331 of the first exposed surface 322, while the lateral surface 636 can define the second edge 332 of the first exposed surface 322. In this manner, assuming the rigid base layer has a total of four protrusions, a total area of the one or more first exposed surfaces is less than 10%, 8%, 6%, 4%, 2%, 1%, or less, of a total area of the upper surface of the mouse pad.

The lower surface 632 of the protrusion 622B generally defines a second exposed surface of the rigid layer that is visible along a lower portion of the mouse pad. In some implementations, the lower surface 632 of the protrusion 622B can define the entirety of one of the second exposed surfaces, e.g., second exposed surface 324 of FIG. 3, of the rigid layer.

Figure 7A:
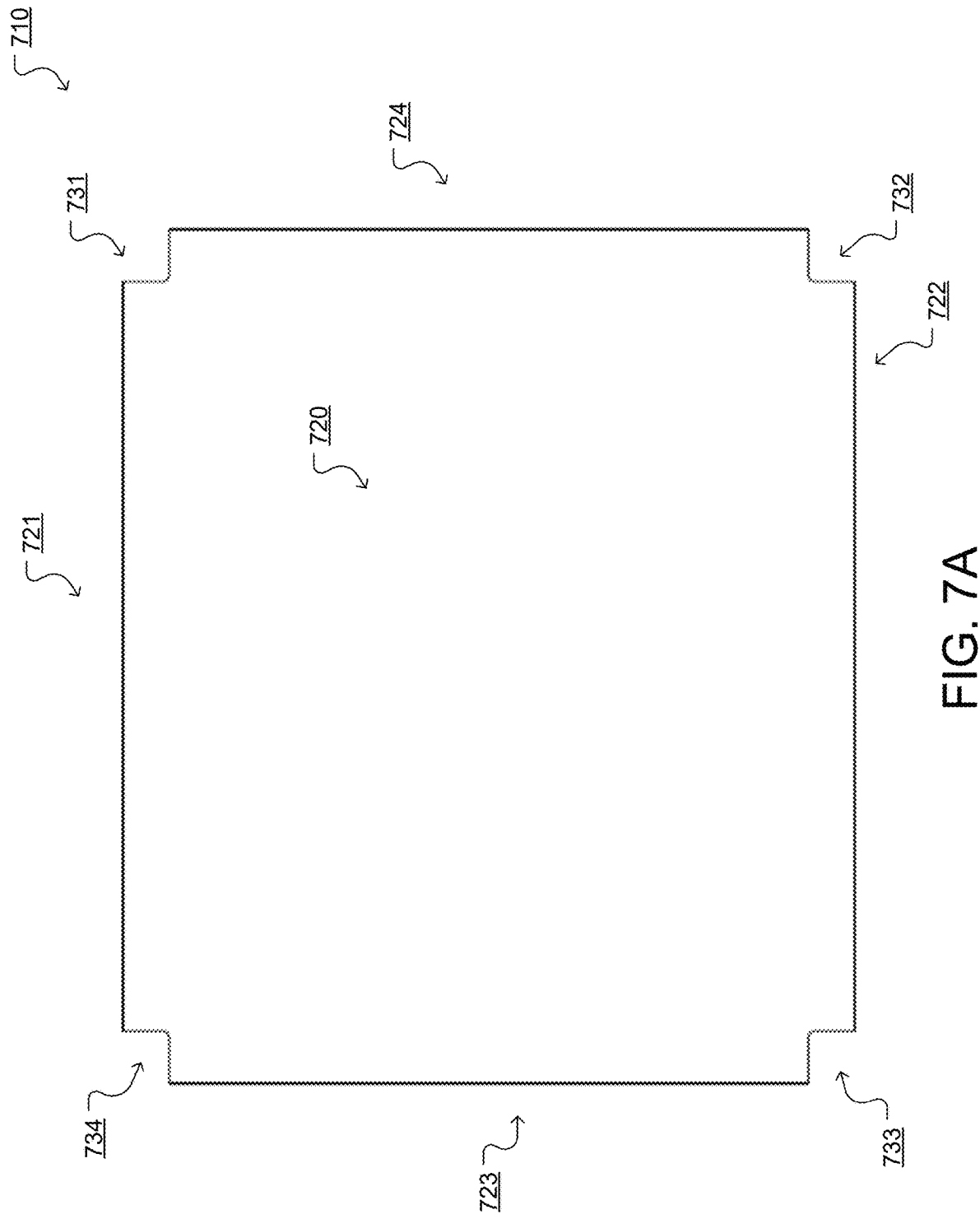
FIG. 7A is a top view of an example of fabric.
Figure 7B:
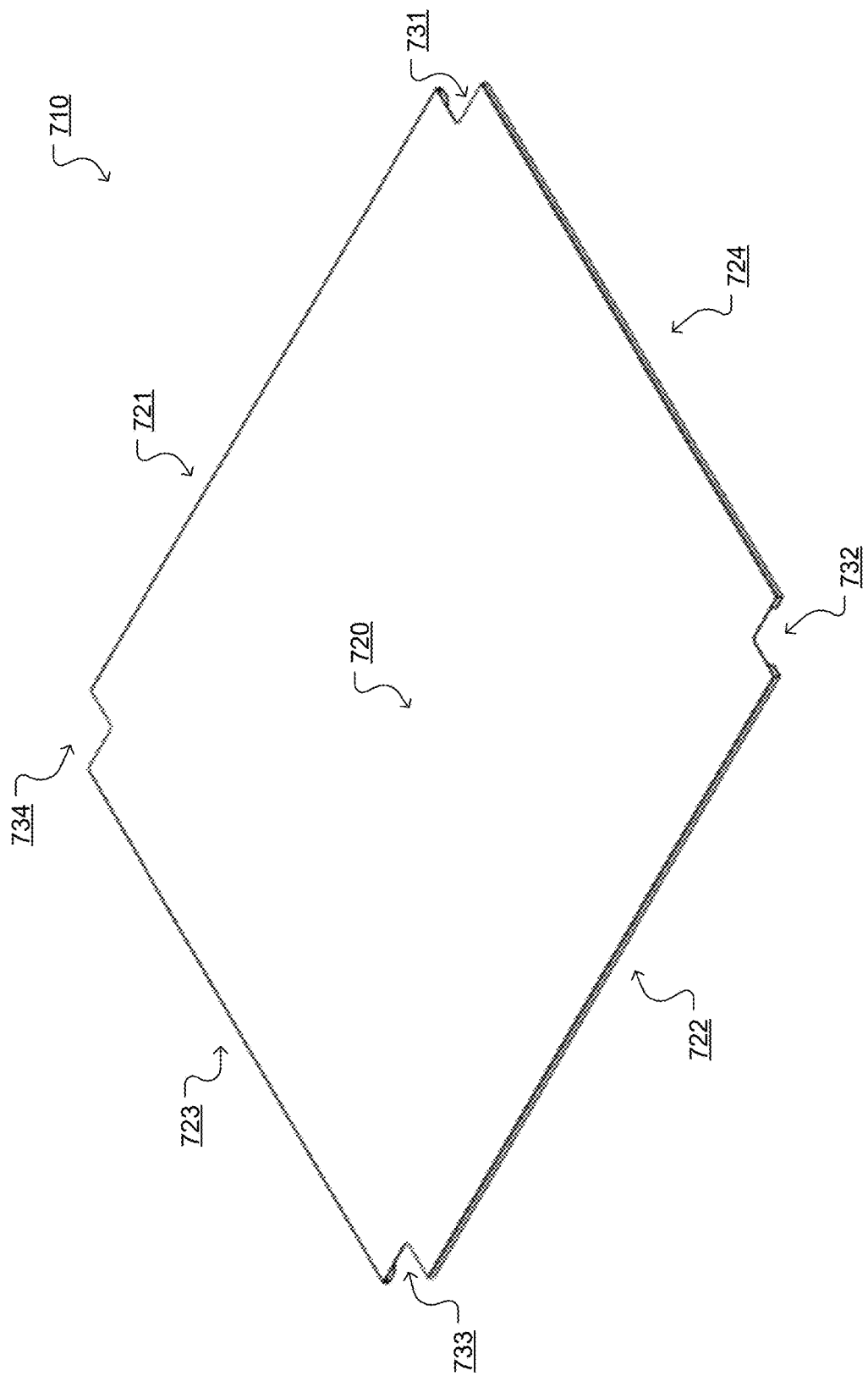
FIG. 7B is a perspective top view of the fabric of FIG. 7A.

FIG. 7A is a top view of an example of fabric 710. FIG. 7B is a perspective top view of the fabric of FIG. 7A. For example, the fabric 710 can be the same as the fabric 110 of FIG. 1. The fabric 710 includes an upper portion 720. In some implementations, the fabric 710 has consistent thickness throughout the upper portion 720. In some implementations, the thickness of the upper portion 720 of the fabric 710 is about equal to the thickness (or height) of the one or more protrusions, e.g., protrusions 622A of FIG. 6A, of the rigid layer.

Because the upper portion 720 of the fabric 710 extends along a portion of the upper surface of the rigid layer, and the one or more protrusions extend upwardly from the upper surface of the base plate of the rigid layer, having about equal thickness can ensure that the upper surface of the mouse pad is substantially planar, and that there is no or minimal difference in height across the upper surface. This in turn facilitates a smoother movement of a computer mouse across the mouse pad.

In FIG. 7A, the upper portion 720 of the fabric 710 includes a first edge 721, a second edge 722, a third edge 723, and a fourth edge 724. The first edge 721 and the second edge 722 are parallel to one another. The first edge 721 (and, analogously, the second edge 722) can have a length that is less than the length of the rigid layer. The third edge 723 and the fourth edge 724 are parallel to one another. The third edge 723 (and, analogously, the fourth edge 724) can have a length that is less than the width of the rigid layer. The first edge 721 and the third edge 723 are perpendicular to one another. The second edge 722 and the fourth edge 724 are perpendicular to one another. The first 721, second 722, third 723, and fourth 724 edges at least partially define a rectangular shape. In this manner, the upper portion 720 of the fabric 710 has a rectangular shape when viewed from above.

The upper portion 720 of the fabric 710 defines a plurality of cutouts at the four corners of the rectangular shape. The plurality of cutouts allow the first exposed surfaces of the rigid layer to be visible when viewed from above. In FIG. 7A, the upper portion 720 includes a first cutout 731 at the corner defined by the first edge 721 and the fourth edge 724, a second cutout 732 at the corner defined by the fourth edge 724 and the second edge 722, a third cutout 733 at the corner defined by the second edge 722 and the third edge 723, and a fourth cutout 734 at the corner defined by the first edge 721 and the third edge 723.

In some implementations, the cutouts 731, 732, 733, and 734 have an identical shape, size, or both. In some implementations, each cutout has about identical shape, size, or both as one of the protrusions of the rigid layer. For example, when viewed in the vertical direction, each cutout can have a rectangular shape that generally match the rectangular shape of a protrusion. Thus, for example, each cutout can have a width between 10 and 40 millimeters, and a length between 10 and 60 millimeters.

Figure 7C:
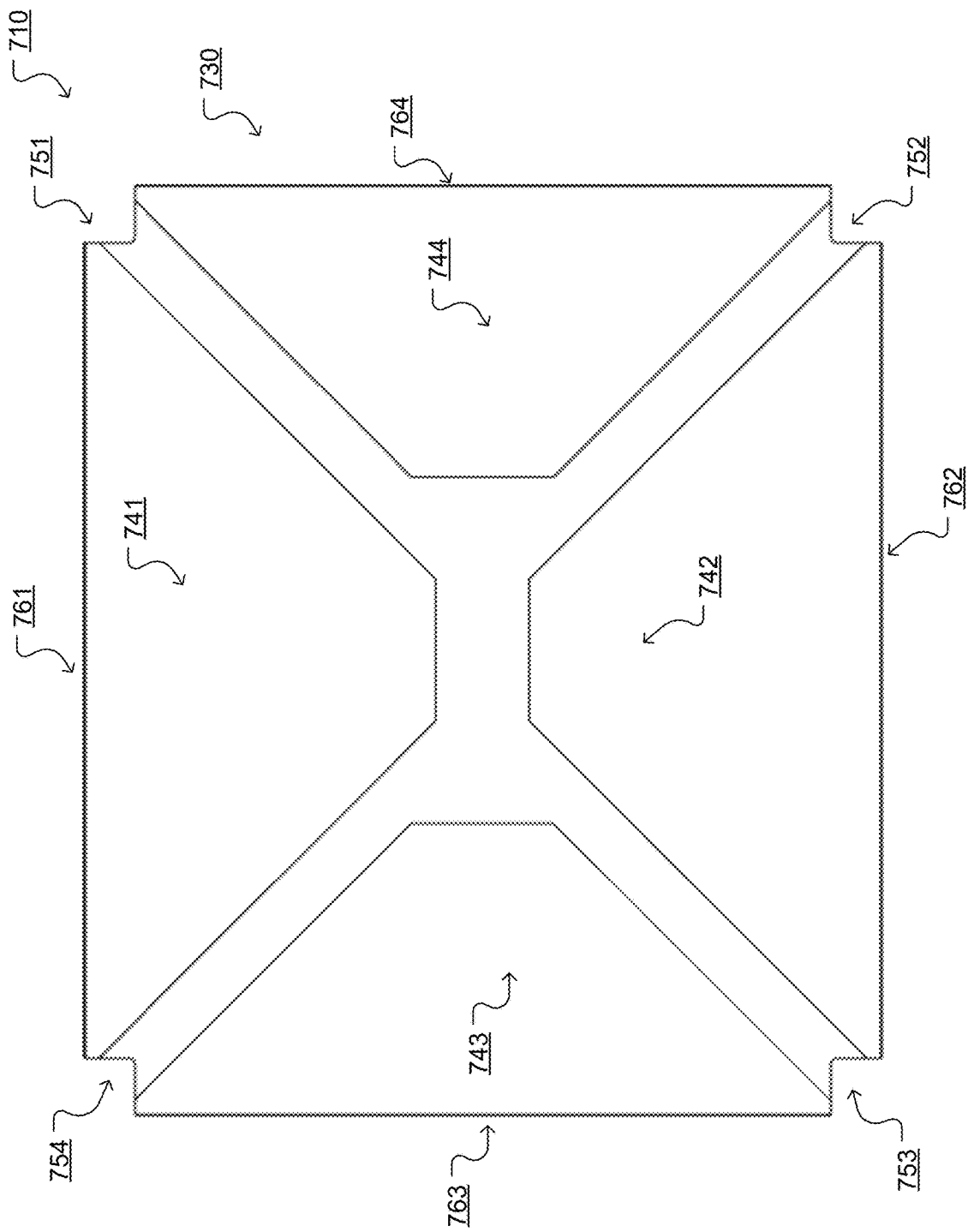
FIG. 7C is a bottom view of the fabric of FIG. 7A.
Figure 7D:
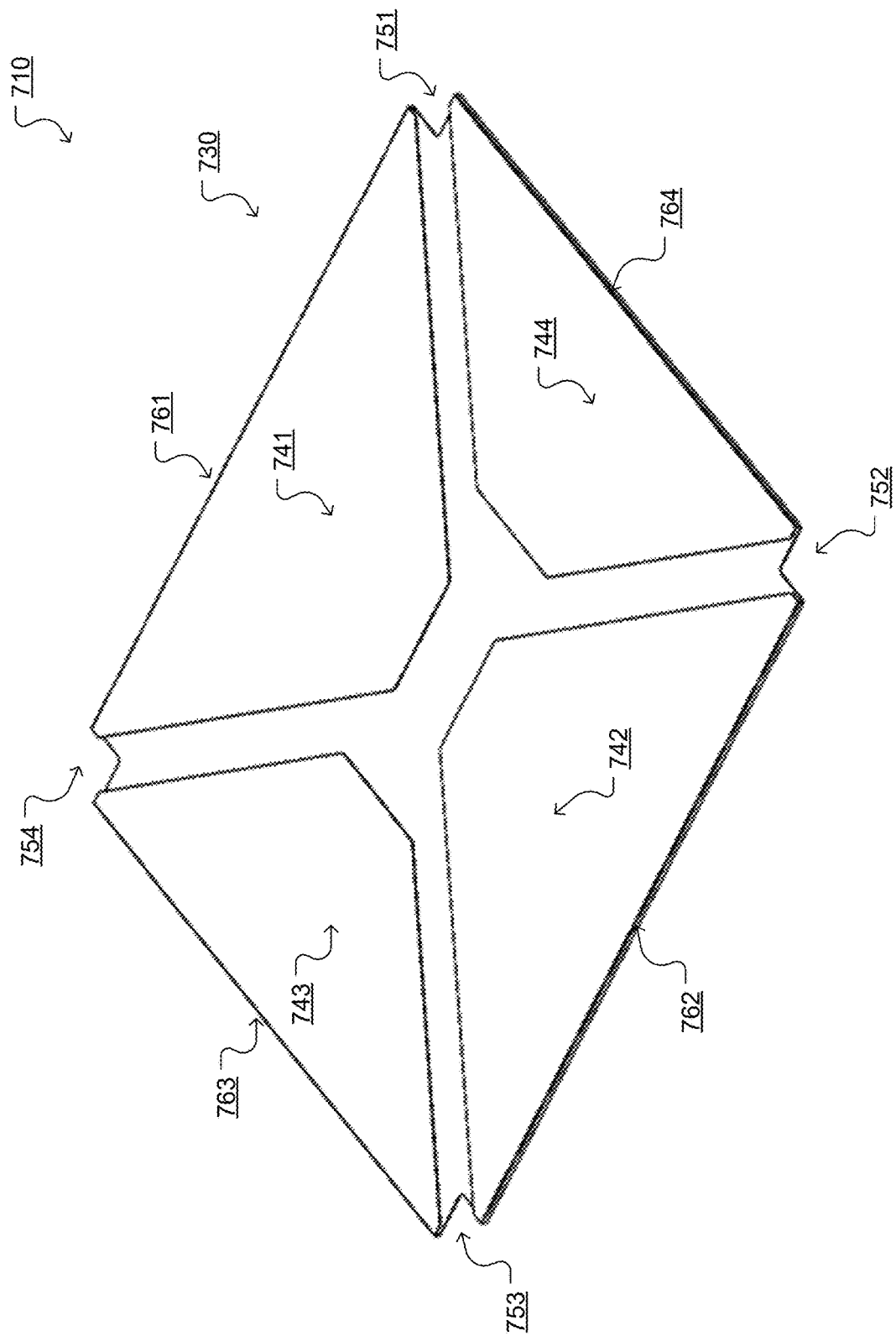
FIG. 7D is a perspective bottom view of the fabric of FIG. 7A.

FIG. 7C is a bottom view of the fabric 710 of FIG. 7A. FIG. 7D is a perspective bottom view of the fabric 710 of FIG. 7A. For example, the fabric 710 can be the same as the fabric 110 of FIG. 1. The fabric 710 includes a lower portion 730. In some implementations, the fabric 710 has consistent thickness throughout the lower portion 730. In some implementations, the thickness of the lower portion 730 of the fabric 710 is about equal to the thickness of the upper portion 720 of the fabric 710.

The lower portion 730 of the fabric 710 extends along a portion of the lower surface of the rigid layer. The lower portion 730 of the fabric 710 includes a plurality of flaps connected to the upper portion 720 of the fabric 710 by respective side portions 761, 762, 763, 764 of the fabric 720. Each side portion of the fabric 710 extends along a corresponding one of the four lateral surfaces of the rigid layer.

The plurality of flaps can each be folded inwardly, i.e., away from the upper portion 720, to partially cover the lower surface of the rigid layer. For example, an adhesive can be applied to an inner surface of each of the plurality of flaps to aid in adhering the fabric 710 and the rigid layer together.

In FIG. 7C, the lower portion 730 includes a first flap 741 connected to the upper portion 720 by a side portion 761 of the fabric 710 that extends along a lateral surface of the rigid layer that is in parallel with the first edge 721, a second flap 742 connected to the upper portion 720 by a side portion 762 of the fabric 710 that extends along a lateral surface of the rigid layer that is in parallel with the second edge 722, a third flap 743 connected to the upper portion 720 by a side portion 763 of the fabric 710 that extends along a lateral surface of the rigid layer that is in parallel with the third edge 723, and a fourth flap 744 connected to the upper portion 720 by a side portion 764 of the fabric 710 that extends along a lateral surface of the rigid layer that is in parallel with the fourth edge 724. In this manner, the first flap 741 and the second flap 742 extends along the longitudinal edges (first edge 721 and second edge 722, respectively) of the rigid layer, while the third flap 743 and the fourth flap 744 extends along the latitudinal edges (third edge 723 and fourth edge 724, respectively) of the rigid layer.

Much like the upper portion 720, the lower portion 730 defines a plurality of cutouts. The plurality of cutouts allow the second exposed surfaces of the rigid layer to be visible when viewed from bottom. In FIG. 7C, the lower portion 730 includes a first cutout 751 at the corner defined by the first flap 741 and the fourth flap 744, a second cutout 752 at the corner defined by the fourth flap 744 and the second flap 742, a third cutout 753 at the corner defined by the second flap 742 and the third flap 743, and a fourth cutout 754 at the corner defined by the first flap 741 and the third flap 743.

In some implementations, the plurality of flaps are spaced apart from one another along the lower surface of the rigid layer. In some implementations, the plurality of flaps have an identical shape. In some implementations, the plurality of flaps include a flap that has a triangular shape, where the edge of the upper portion 720 of the fabric 710 defines a base of the triangular shape. In some implementations, the plurality of flaps include a flap that has a trapezoidal shape, where the edge of the upper portion 720 of the fabric 710 defines a base of the trapezoidal shape. For example, in FIG. 7C, each flap has an isosceles trapezoidal shape narrowing toward the center of the fabric 710.

Figure 7E:
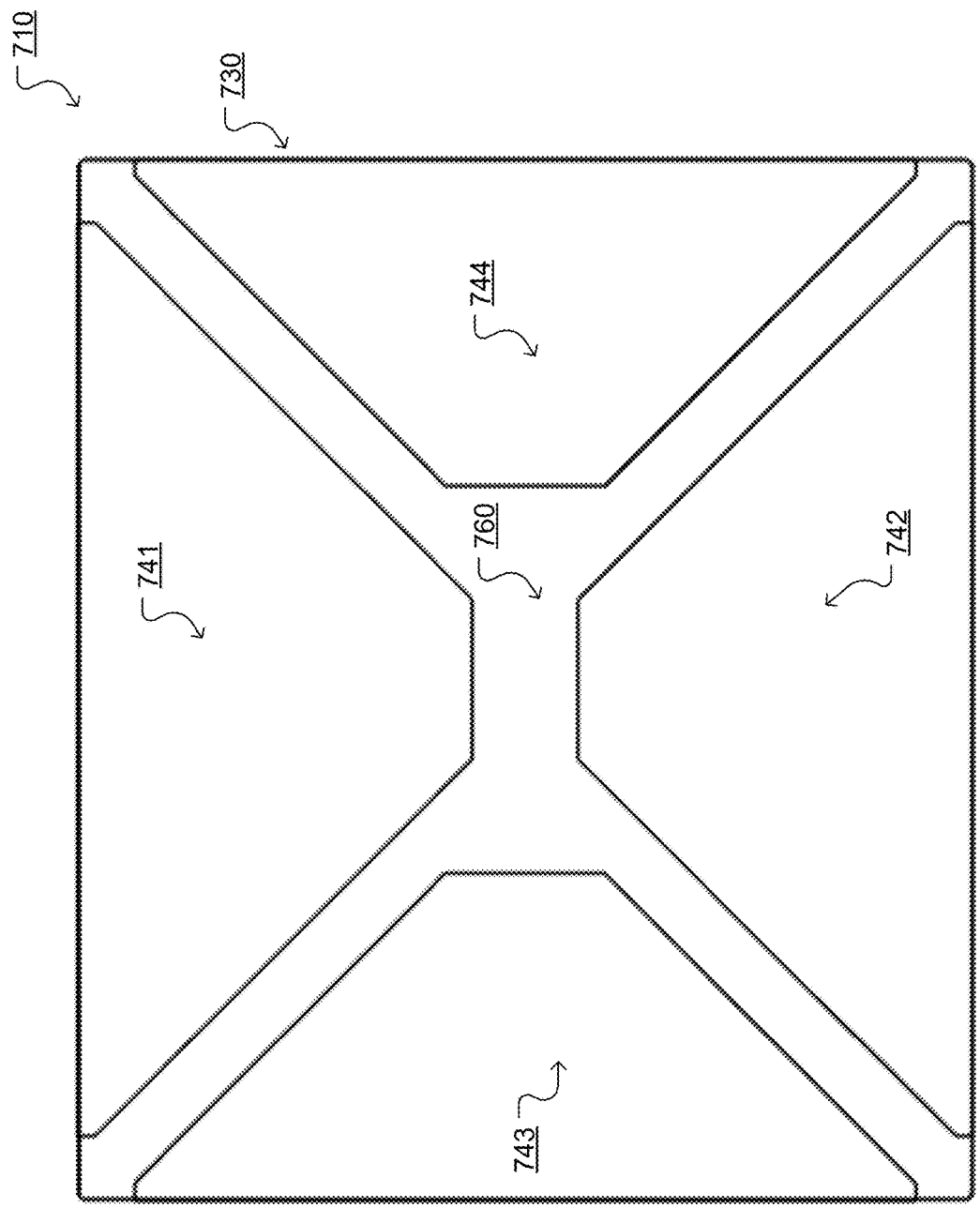
FIG. 7E is a bottom view of fabric and a rigid layer.

FIG. 7E is a bottom view of fabric 710 and a rigid layer 760. For example, the fabric 710 can be the same as the fabric 110 of FIG. 1, and the rigid layer 760 can be the same as the rigid layer 120 of FIG. 1. The bottom view of the fabric 710 and the rigid layer 760 is shown with the lower portion of the mouse pad removed to expose the underlying portion of the fabric 710 and the rigid layer 760 that overlaps the lower portion of the mouse pad. As shown, the plurality of flaps 741, 742, 743, and 744 included in the lower portion 730 of the fabric 710 folds inwardly, i.e., away from the upper portion of the fabric, to partially cover the lower surface of the rigid layer 760 that faces toward the lower portion of the mouse pad. In this manner, the fabric 710 partially covers (e.g., wraps around) the rigid layer 760.

Figure 8:
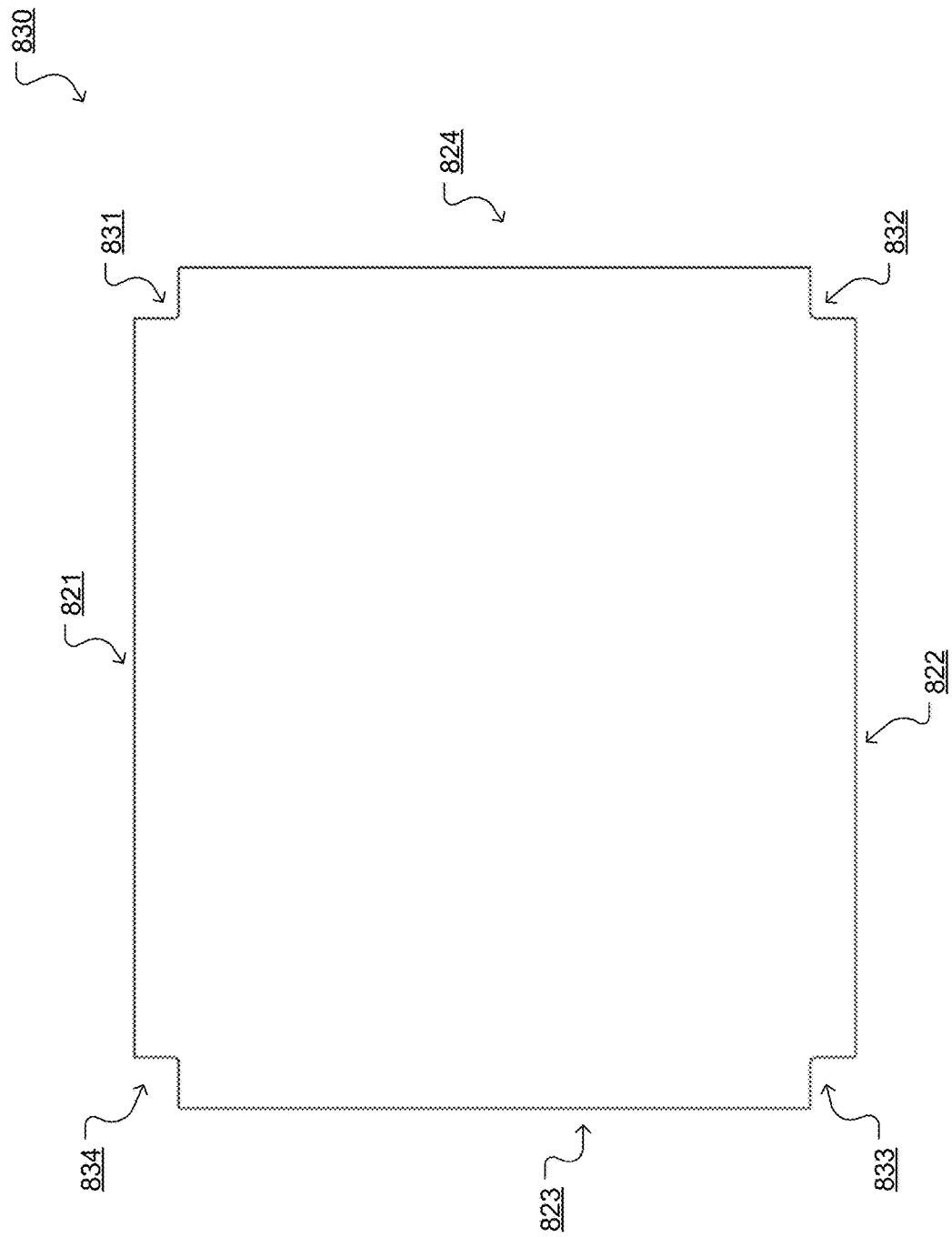
FIG. 8 is a bottom view of an example of a lower portion of a mouse pad.

FIG. 8 is a bottom view of an example of a lower portion 830 of a mousepad. For example, the lower portion 830 can be the same as the lower portion 130 of FIG. 1. In some implementations, the lower portion 830 is thinner than the base plate of the rigid layer. For example, the thickness of the lower portion 830 can be no greater than 80%, 60%, 50%, or less of the thickness of the base plate of the rigid layer.

Much like the upper portion of the fabric, when viewed in the vertical direction, the lower portion 830 of the mousepad has a rectangular shape with a plurality of cutouts at corners of the rectangular shape. The plurality of cutouts (together with the plurality of cutouts of the lower portion 730 of the fabric 730) allow the second exposed surfaces of the rigid layer to be visible when viewed from bottom.

In FIG. 8, the lower portion 830 of the mousepad includes a first edge 821, a second edge 822, a third edge 823, and a fourth edge 824. The first edge 821 and the second edge 822 are parallel to one another. The first edge 821 (and, analogously, the second edge 822) can have a length that is less than the length of the rigid layer. The third edge 823 and the fourth edge 824 are parallel to one another. The third edge 823 (and, analogously, the fourth edge 824) can have a length that is less than the width of the rigid layer. The first edge 821 and the third edge 823 are perpendicular to one another. The second edge 822 and the fourth edge 824 are perpendicular to one another. The first 821, second 822, third 823, and fourth 824 edges at least partially define a rectangular shape. In this manner, the lower portion 830 has a rectangular shape when viewed in the vertical direction.

The lower portion 830 of the mousepad defines a plurality of cutouts at the four corners of the rectangular shape. In FIG. 8, the lower portion 830 includes a first cutout 831 at the corner defined by the first edge 721 and the fourth edge 824, a second cutout 832 at the corner defined by the fourth edge 824 and the second edge 822, a third cutout 833 at the corner defined by the second edge 822 and the third edge 823, and a fourth cutout 834 at the corner defined by the first edge 821 and the third edge 823.

In some implementations, the cutouts 831, 832, 833, and 834 have an identical shape, size, or both. In some implementations, each cutout has about identical shape, size, or both as one of the protrusions of the rigid layer. For example, when viewed in the vertical direction, each cutout can have a rectangular shape that generally match the rectangular shape of a protrusion. Thus, for example, each cutout can have a width between 10 and 40 millimeters, and a length between 10 and 60 millimeters.

In some implementations, the corner of the cutout is rounded. The rounded corner of the cutout can have a radius of curvature between 1.0 and 6.0 millimeters (e.g., between 1.0 and 5.0 millimeters, between 1.0 and 4.0 millimeters, between 2.0 and 3.0 millimeters, about 3.0 millimeters, about 2.62 millimeters, about 2.75 millimeters, etc.). In some implementations, the rounded corners of the cutouts have the same radius of curvature while in other implementations, a rounded corner of a cutout has a different radius of curvature than a rounded corner of another cutout.

A number of implementations have been described. While this specification contains many specific implementation details, these should not be construed as limitations on the scope of what is being claimed, which is defined by the claims themselves, but rather as descriptions of features that may be specific to particular implementations of particular inventions. It will be understood that various modifications may be made.

Computers (e.g., the computing device to which the computer mouse is connected) suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device (e.g., that displays the cursor controllable by the computer mouse), e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball, a touchpad, and examples of the computer mouse 250 described in this disclosure.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Accordingly, other implementations are within the scope of the claims.

What is claimed is:

1. A mouse pad comprising:
   fabric comprising an upper portion that partially defines an upper surface of the mouse pad;
   a rigid layer comprising one or more exposed surfaces that partially define the upper surface of the mouse pad, wherein the rigid layer comprises:
   a base plate comprising glass, and
   one or more protrusions on the base plate comprising the one or more exposed surfaces, wherein a thickness of the fabric is about equal to a height of the one or more protrusions of the rigid layer; and
   a grip surface on a lower portion of the mouse pad.

2. The mouse pad of claim 1, wherein the fabric is opaque, and the rigid layer is translucent.

3. The mouse pad of claim 1, wherein the base plate comprises an upper surface and a lower surface, the upper surface and the lower surface of the base plate being substantially planar.

4. The mouse pad of claim 1, wherein the one or more protrusions are affixed to the upper surface of the base plate.

5. The mouse pad of claim 1, wherein the one or more protrusions are integral to the base plate.

6. The mouse pad of claim 1, wherein the height of the one or more protrusions relative to the base plate is less than 20% of a height of the base plate of the rigid layer.

7. The mouse pad of claim 1, wherein a thickness of the lower portion of the mouse pad is no greater than 50% of the height of the base plate of the rigid layer.

8. The mouse pad of claim 1, wherein the one or more exposed surfaces are one or more first exposed surfaces visible along an upper portion of the mouse pad, and the rigid layer comprises one or more second exposed surfaces visible along a lower portion of the mouse pad.

9. The mouse pad of claim 8, wherein the one or more first exposed surfaces and the one or more second exposed surfaces are aligned along a height of the rigid layer.

10. The mouse pad of claim 1, wherein the mouse pad is rectangular and comprises four corner portions, and the one or more exposed surfaces of the rigid layer comprises an exposed surface positioned at a corner portion of the four corner portions of the mouse pad.

11. The mouse pad of claim 10, wherein the one or more exposed surfaces of the rigid layer comprises a plurality of exposed surfaces, and each of the plurality of exposed surfaces is positioned at a corresponding corner portion of the four corner portions of the mouse pad.

12. The mouse pad of claim 11, wherein the exposed surface comprises an edge at least partially defining an outer perimeter of the upper surface of the mouse pad.

13. The mouse pad of claim 12, wherein the edge is a first edge, and the exposed surface comprises a second edge extending along a perimeter of the upper portion of the fabric.

14. The mouse pad of claim 13, wherein the exposed surface comprises a rectangular shape at least partially defined by the first edge and the second edge.

15. The mouse pad of claim 14, wherein the exposed surface comprises a curved edge connecting the first edge and the second edge.

16. The mouse pad of claim 1, wherein the exposed surface has a dimension in a range of 20 mm to 30 mm along a longitudinal dimension of the mouse pad.

17. The mouse pad of claim 16, wherein the exposed surface has a dimension in a range of 20 mm to 30 mm along a latitudinal dimension of the mouse pad.

18. The mouse pad of claim 17, wherein the dimension of the exposed surface along the longitudinal dimension of the mouse pad is greater than the dimension of the exposed surface along the latitudinal dimension of the mouse pad.

19. The mouse pad of claim 1, wherein a total area of the one or more exposed surfaces is less than 2% of a total area of the upper surface of the mouse pad.

20. The mouse pad of claim 1, wherein the one or more exposed surfaces comprise four exposed surfaces.

21. The mouse pad of claim 1, wherein:
the upper portion of the fabric extends along an upper surface of the rigid layer and comprises first, second, third, and fourth edges at least partially defining a rectangular shape, the first and second edges being parallel to one another, and the third and fourth edges being parallel to one another, and
the upper portion of the fabric defines a plurality of cutouts at corners of the rectangular shape.

22. The mouse pad of claim 21, wherein the fabric comprises a lower portion extending along a lower surface of the rigid layer.

23. The mouse pad of claim 22, wherein the lower portion of the fabric comprises a plurality of flaps connected to the upper portion of the fabric.

24. The mouse pad of claim 23, wherein the plurality of flaps are spaced apart from one another along the lower surface of the rigid layer.

25. The mouse pad of claim 23, wherein the plurality of flaps comprises a flap having an isosceles trapezoidal shape.

26. The mouse pad of claim 23, wherein the plurality of flaps comprises first, second, third, and fourth flaps, the first and second flaps extending along longitudinal edges of the mouse pad, and the third and fourth flaps extending along latitudinal edges of the mouse pad.

27. The mouse pad of claim 21, wherein the lower portion of the fabric and the upper portion of the fabric are connected by a side portion of the fabric, the side portion of the fabric extending along one or more lateral surfaces of the rigid layer.

28. The mouse pad of claim 1, wherein the one or more protrusions are made of plastic.

29. A mouse pad comprising:
fabric comprising an upper portion that partially defines an upper surface of the mouse pad;
a rigid layer comprising a plurality of exposed surfaces that partially define the upper surface of the mouse pad; and
a grip surface on a lower portion of the mouse pad,
wherein the mouse pad is rectangular and comprises four corner portions, each of the plurality of exposed surfaces is positioned at a corresponding corner portion of the four corner portions of the mouse pad, and an exposed surface of the plurality of exposed surfaces comprises an edge at least partially defining an outer perimeter of the upper surface of the mouse pad.

30. The mouse pad of claim 29, wherein the edge is a first edge, and the exposed surface comprises a second edge extending along a perimeter of the upper portion of the fabric.

31. The mouse pad of claim 30, wherein the exposed surface comprises a rectangular shape at least partially defined by the first edge and the second edge.

32. The mouse pad of claim 31, wherein the exposed surface comprises a curved edge connecting the first edge and the second edge.

33. A mouse pad comprising:
fabric comprising an upper portion that partially defines an upper surface of the mouse pad;
a rigid layer comprising one or more exposed surfaces that partially define the upper surface of the mouse pad; and
a grip surface on a lower portion of the mouse pad,
wherein the upper portion of the fabric extends along an upper surface of the rigid layer and comprises first, second, third, and fourth edges at least partially defining a rectangular shape, the first and second edges being parallel to one another, and the third and fourth edges being parallel to one another, and
wherein the upper portion of the fabric defines a plurality of cutouts at corners of the rectangular shape.

34. The mouse pad of claim 33, wherein the fabric comprises a lower portion extending along a lower surface of the rigid layer.

35. The mouse pad of claim 34, wherein the lower portion of the fabric comprises a plurality of flaps connected to the upper portion of the fabric.

36. The mouse pad of claim 35, wherein the plurality of flaps are spaced apart from one another along the lower surface of the rigid layer.

37. The mouse pad of claim 35, wherein the plurality of flaps comprises a flap having an isosceles trapezoidal shape.

38. The mouse pad of claim 35, wherein the plurality of flaps comprises first, second, third, and fourth flaps, the first and second flaps extending along longitudinal edges of the mouse pad, and the third and fourth flaps extending along latitudinal edges of the mouse pad.

39. The mouse pad of claim 33, wherein the lower portion of the fabric and the upper portion of the fabric are connected by a side portion of the fabric, the side portion of the fabric extending along one or more lateral surfaces of the rigid layer.

* * * * *